United States Patent
Enya et al.

(10) Patent No.: US 8,009,024 B2
(45) Date of Patent: Aug. 30, 2011

(54) AUTOMOTIVE DISPLAY DEVICE SHOWING VIRTUAL IMAGE SPOT ENCIRCLING FRONT OBSTACLE

(75) Inventors: Takeshi Enya, Nagoya (JP); Masaru Kakizaki, Nagoya (JP)

(73) Assignee: Denso Corporation, Kariya (JP)

( * ) Notice: Subject to any disclaimer, the term of this patent is extended or adjusted under 35 U.S.C. 154(b) by 412 days.

(21) Appl. No.: 12/318,927

(22) Filed: Jan. 13, 2009

(65) Prior Publication Data

US 2009/0189753 A1    Jul. 30, 2009

(30) Foreign Application Priority Data

Jan. 25, 2008    (JP) ................................. 2008-015289

(51) Int. Cl.
*B60Q 1/00*    (2006.01)
(52) U.S. Cl. ........ 340/435; 340/436; 340/437; 340/438; 340/461; 340/901; 340/902; 340/903; 340/937; 340/995.1; 381/59; 381/79; 381/86; 381/102; 381/103; 701/301; 701/302; 348/25; 348/113; 348/118; 348/135
(58) Field of Classification Search .................. 340/435, 340/436, 437, 438, 461, 901, 902, 903, 937, 340/995.1; 381/59, 79, 86, 102, 103; 348/25, 348/113, 118, 135; 701/301, 302
See application file for complete search history.

(56) References Cited

U.S. PATENT DOCUMENTS

| 5,230,082 A | 7/1993 | Ghisler et al. |
| 5,801,667 A * | 9/1998 | Shimizu et al. ................... 345/7 |
| 6,327,536 B1 | 12/2001 | Tsuji et al. |
| 2005/0134479 A1 * | 6/2005 | Isaji et al. ..................... 340/901 |
| 2005/0273263 A1 * | 12/2005 | Egami et al. .................. 701/301 |

FOREIGN PATENT DOCUMENTS

| JP | A-H7-68715 | 3/1995 |
| JP | A-2003-341017 | 12/2003 |

OTHER PUBLICATIONS

H. Asada et al., "HMI Transformed along with Its Evolution", *Automotive Technology*, vol. 60, No. 2, 2006, p. 73.
U.S. Appl. No. 12/222,326, filed Aug. 7, 2008, Kakizaki.

* cited by examiner

*Primary Examiner* — Tai T Nguyen
(74) *Attorney, Agent, or Firm* — Posz Law Group, PLC (57) ABSTRACT

A display device of the present invention is mounted on an automotive vehicle. An obstacle located in front of the vehicle is detected by a camera, and its features including speed, distance, size, etc. are analyzed by electronic circuits. An image showing the features of the front object is outputted from a liquid crystal panel. The outputted image is reflected on the windshield, displaying a virtual image to a driver. The virtual image is displayed in a form of a spot encircling the front obstacle seen through the windshield. The ways of displaying the encircling spot are variously changed according to a degree of collision danger that is determined according to a period in which the vehicle reaches the obstacle. For example, if the degree of collision danger is high, the spot is shown in red-orange color and/or with a high brightness. Thus, the driver easily recognizes the front obstacle in a high degree of collision danger.

10 Claims, 9 Drawing Sheets

AUTOMOTIVE DISPLAY DEVICE SHOWING VIRTUAL IMAGE SPOT ENCIRCLING FRONT OBSTACLE

CROSS-REFERENCE TO RELATED APPLICATION

This application is based upon and claims benefit of priority of Japanese Patent Application No. 2008-15289 filed on Jan. 25, 2008, the content of which is incorporated herein by reference.

BACKGROUND OF THE INVENTION

1. Field of the Invention

The present invention relates to a display device for effectively showing a front obstacle to a driver of an automotive vehicle.

2. Description of Related Art

A system for giving information about a front obstacle to a driver of an automotive vehicle has been put into market. For example, in a navigation system, an object irradiating infrared light is detected by an infrared camera mounted on a vehicle, and whether the object stays on a road or is crossing a road is determined. Further, whether the object is a pedestrian or another vehicle is detected. The image in front of the vehicle detected by the infrared camera is displayed on a display panel to the driver. However, a problem that a driver has to move his eyes onto the display panel from a windshield to get information displayed on the display panel is involved in this system.

Figure 8:
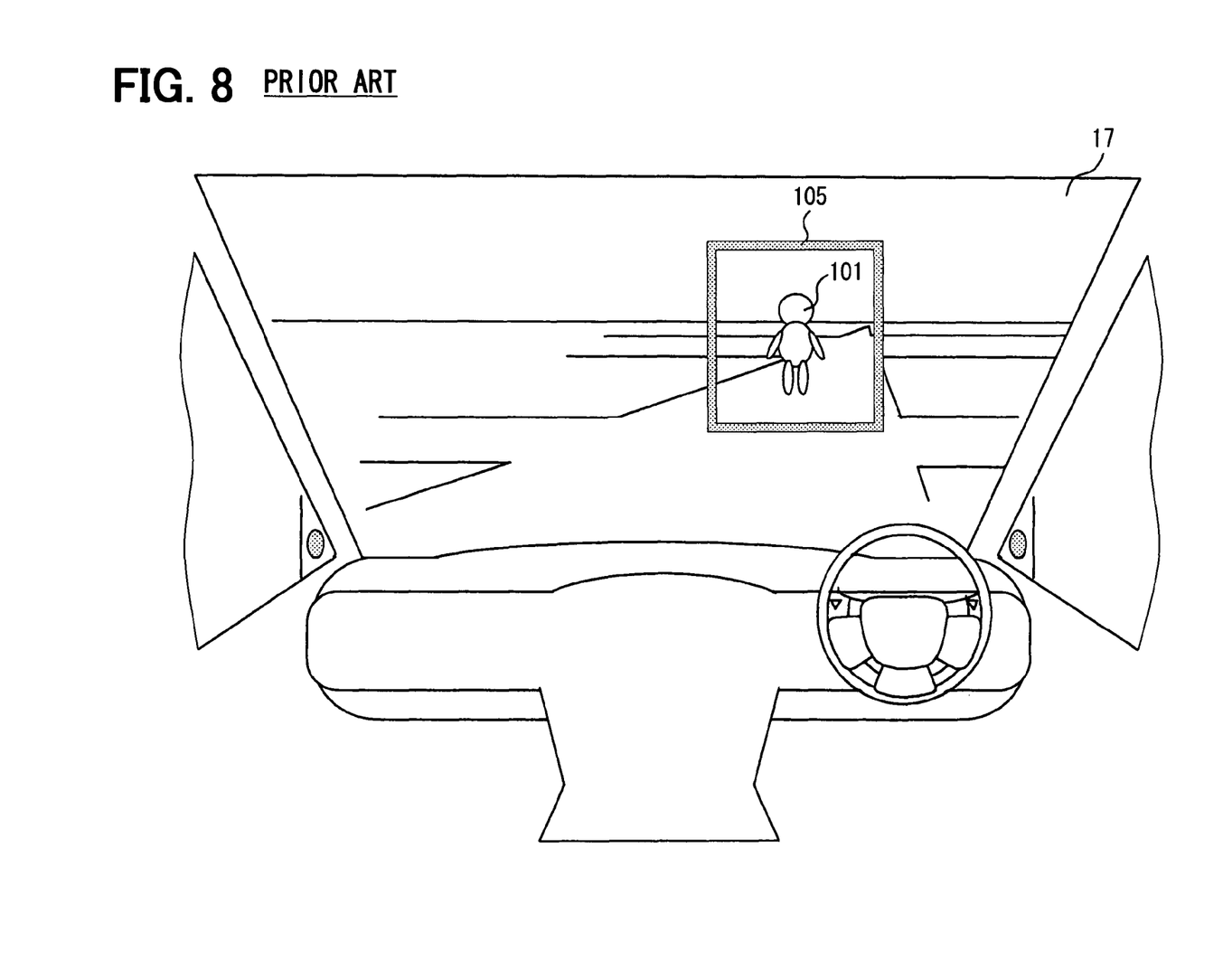
FIG. 8 is a schematic drawing showing a virtual image in a square surrounding a front pedestrian in a conventional system.

To solve the above problem, a system is proposed in "HMI Transformed along with ITS Evolution" written by H. Asada et al., published in "Automotive Technology" (Page 73, Vol. 60, No. 2, 2006). In this system, a virtual image 105 in a shape of square surrounding a front obstacle 101 (such as a pedestrian) seen through a windshield 17 is shown on the windshield 17, as shown in FIG. 8 attached hereto. The image is formed in an on-board device and reflected on the windshield to show it as a virtual image to a driver. In this manner, the driver easily recognizes the front obstacle surrounded by the square virtual image 105 without moving his eyes from the front obstacle seen through the windshield.

Figure 9:
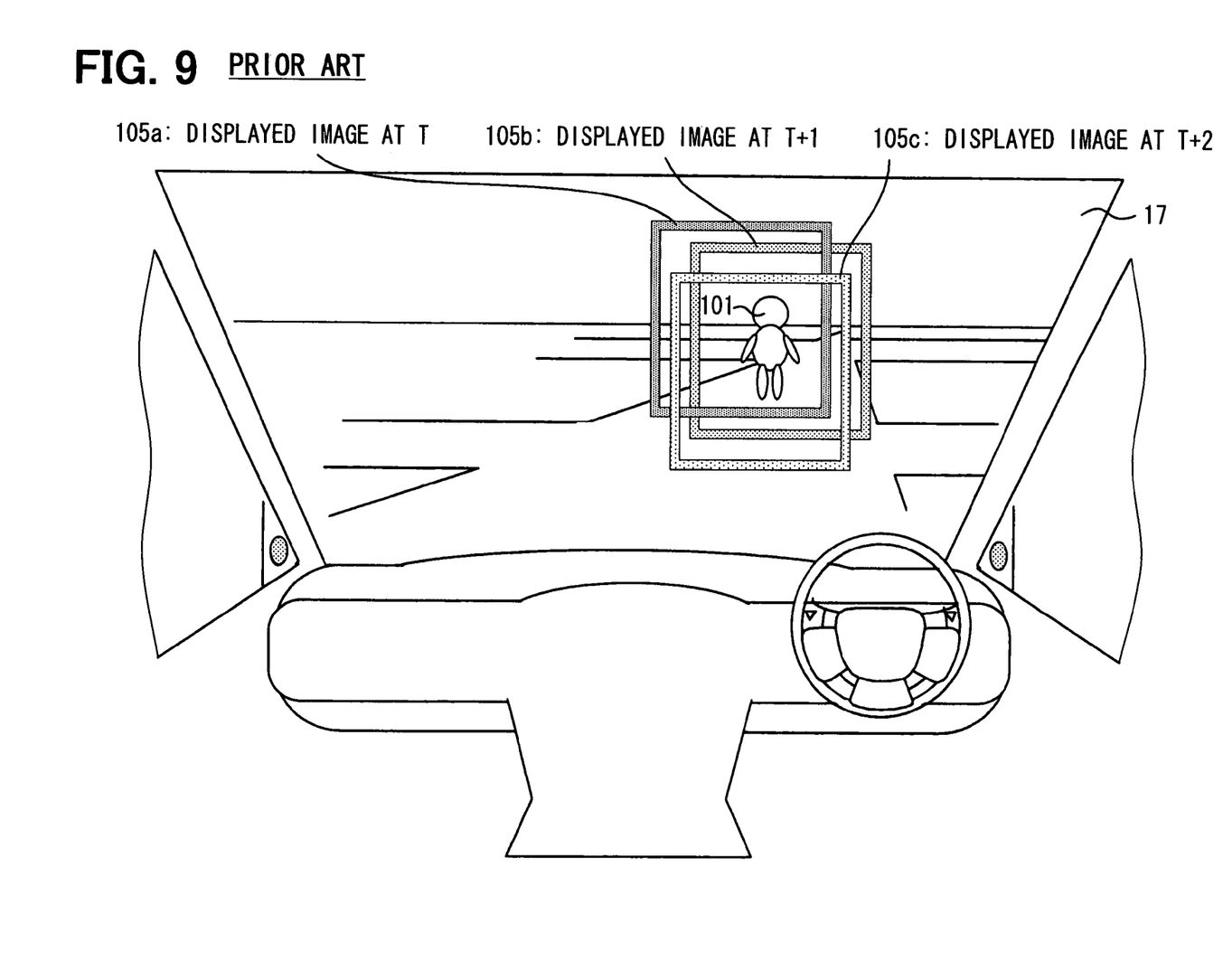
FIG. 9 is a schematic drawing showing the virtual image shown in FIG. 8, the virtual image being vibrating due to vibration of a vehicle.

A degree of collision danger with a front obstacle widely varies according to situations. For example, the degree of danger depends on a distance and a relative speed between the own vehicle and a front obstacle. In the system shown in the above publication, however, the virtual image surrounding the front obstacle does not vary depending on the degree of collision danger. That is, the same virtual image square is shown. Therefore, the driver is not able to quickly notice an obstacle having a high degree of collision danger. In addition, the virtual image 105 reflected on the windshield 17 vibrates according to vibration of the vehicle. As shown in FIG. 9 attached hereto, a virtual image 105a is shown at time T, a virtual image 105b at time T+1, a virtual image 105c at time T+2, and so on. That is, the virtual image 105 does not stay at the same position. Therefore, it is troublesome and uncomfortable for the driver to watch the virtual image 105.

SUMMARY OF THE INVENTION

The present invention has been made in view of the above-mentioned problems, and an object of the present invention is to provide an improved display device for a driver, which shows a front obstacle in an easily noticeable manner and a virtual image encircling the obstacle in a manner suppressing influence of vibration of the vehicle.

The display device of the present invention is mounted on an automotive vehicle. The display device includes a camera for taking a picture of an obstacle in front of the vehicle through a windshield, an obstacle-detecting circuit, a setting circuit for setting a degree of collision danger, an image-outputting circuit and a liquid crystal display panel. The image-outputting circuit outputs an image to the liquid crystal panel according to data fed from the obstacle-detecting circuit and the setting circuit. The image on the liquid crystal display panel is reflected on the windshield, showing a virtual image to a driver. The virtual image is shown as a form of a spot encircling a front object seen through the windshield.

Ways of display of the virtual image spot are variously changed according to a degree of collision danger between the own vehicle and the detected front obstacle. The degree of collision danger is set according to a period of time, in which the vehicle reaches the front obstacle (referred to as a reaching time). The color of the virtual image spot encircling the front obstacle seen through the windshield is determined according to the degree of collision danger. That is, the color is set to red-orange if the degree of collision danger is high, while it is set to blue-green if the degree of collision danger is not so high. If the degree of collision danger is very high (when the reaching time is less than 5 seconds), only a warning sound is given to the driver without displaying the virtual image spot. If the degree of collision danger is very low (when the reaching time is longer than 10 seconds), the virtual image spot is not displayed.

Not only the color of the virtual image spot but also its brightness, size, encircling speed and/or a diameter of a circle along which the spot encircles may be changed according to the degree of collision danger, i.e., the reaching time. Further, the shape of the circle along which the spot encircles maybe changed according to types of the detected front obstacle. For example, the circle may be changed to an oval having a major axis in the horizontal direction if the front obstacle is a vehicle, while it may be changed to an oval having a major axis in the vertical direction if the front obstacle is a pedestrian.

According to the present invention, a driver easily recognizes a front obstacle in a high degree of collision danger according to a manner of displaying the virtual image spot encircling the front obstacle. Further, since the virtual image is a moving spot instead of a solid square, vibration of the virtual image spot due to vibration of the vehicle is hardly noticed by the driver. Other objects and features of the present invention will become more readily apparent from a better understanding of the preferred embodiment described below with reference to the following drawings.

DETAILED DESCRIPTION OF THE PREFERRED EMBODIMENT

Figure 1:
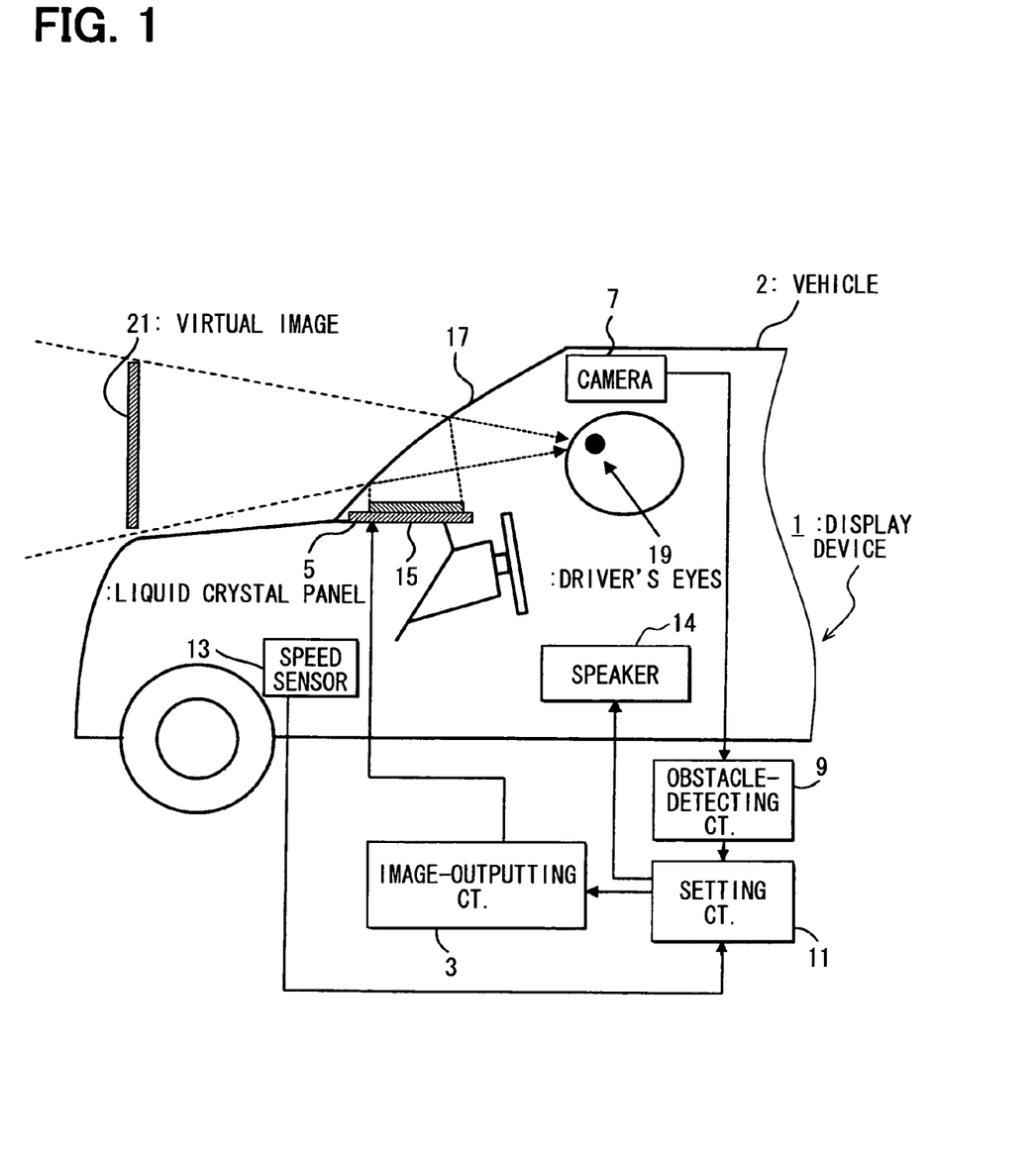
FIG. 1 is a schematic diagram showing an entire structure of a display device mounted on an automotive vehicle according to the present invention.

A structure of a preferred embodiment of the present invention will be described with reference to FIGS. 1, 4 and 5. A display device 1 is mounted on an automotive vehicle 2. The display device 1 includes an image-outputting circuit 3, a liquid crystal panel 5, a camera 7, an obstacle-detecting circuit 9, a setting circuit 11 for setting a degree of collision danger, a vehicle speed sensor 13 and a speaker 14. The image-outputting circuit 3 outputs images to the liquid crystal panel 5. The liquid crystal panel 5 is disposed on an instrument panel 15 and displays images outputted from the image-outputting circuit 3. Light showing the image on the liquid crystal panel 5 is reflected on a windshield 17 and enters driver's eyes. As a result, the image is seen from the driver in front of the windshield 17 as a virtual image 21, as shown in FIG. 1.

Figure 4:
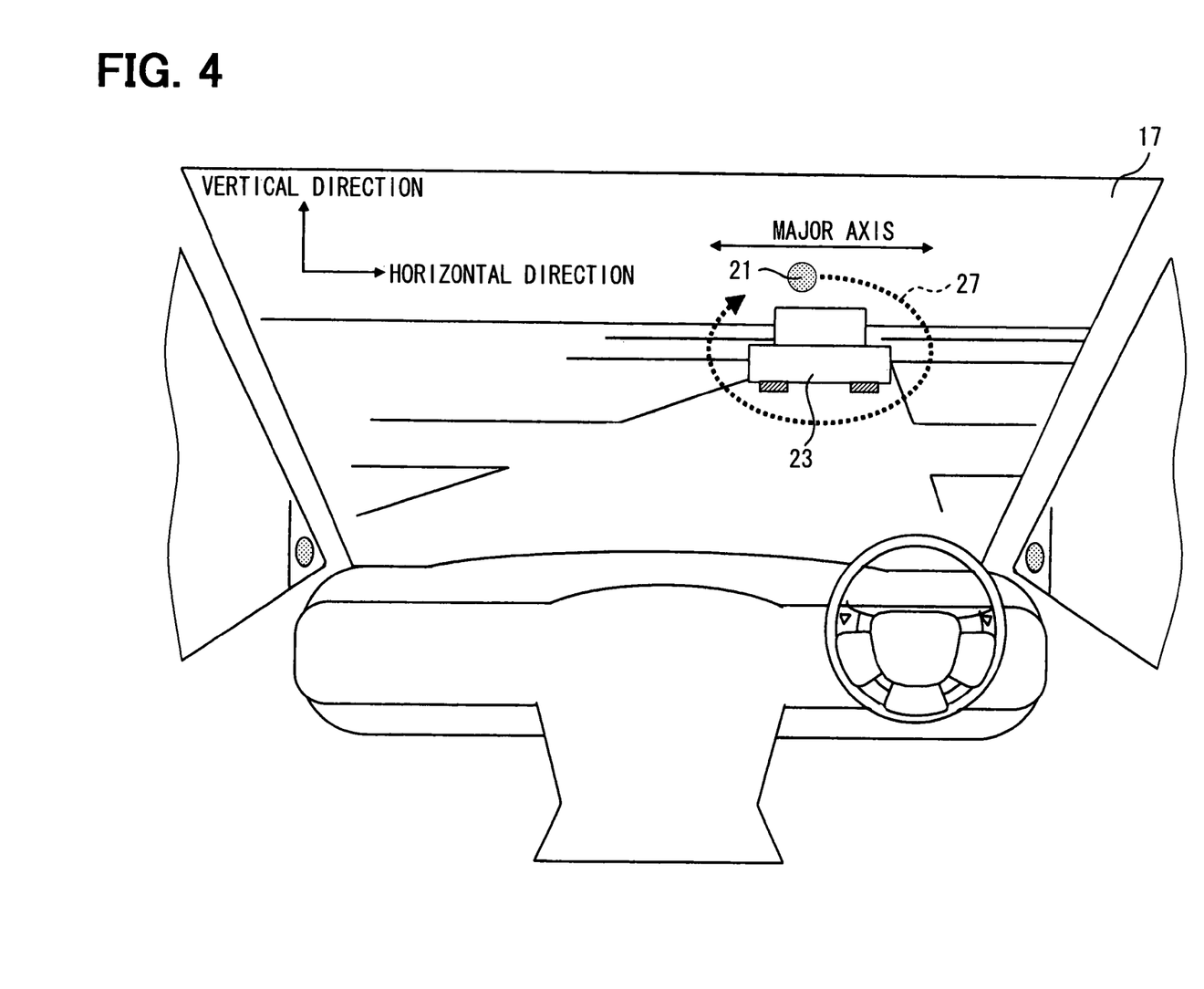
FIG. 4 is a schematic drawing showing a virtual image spot encircling a front vehicle seen by a driver through a windshield.
Figure 5:
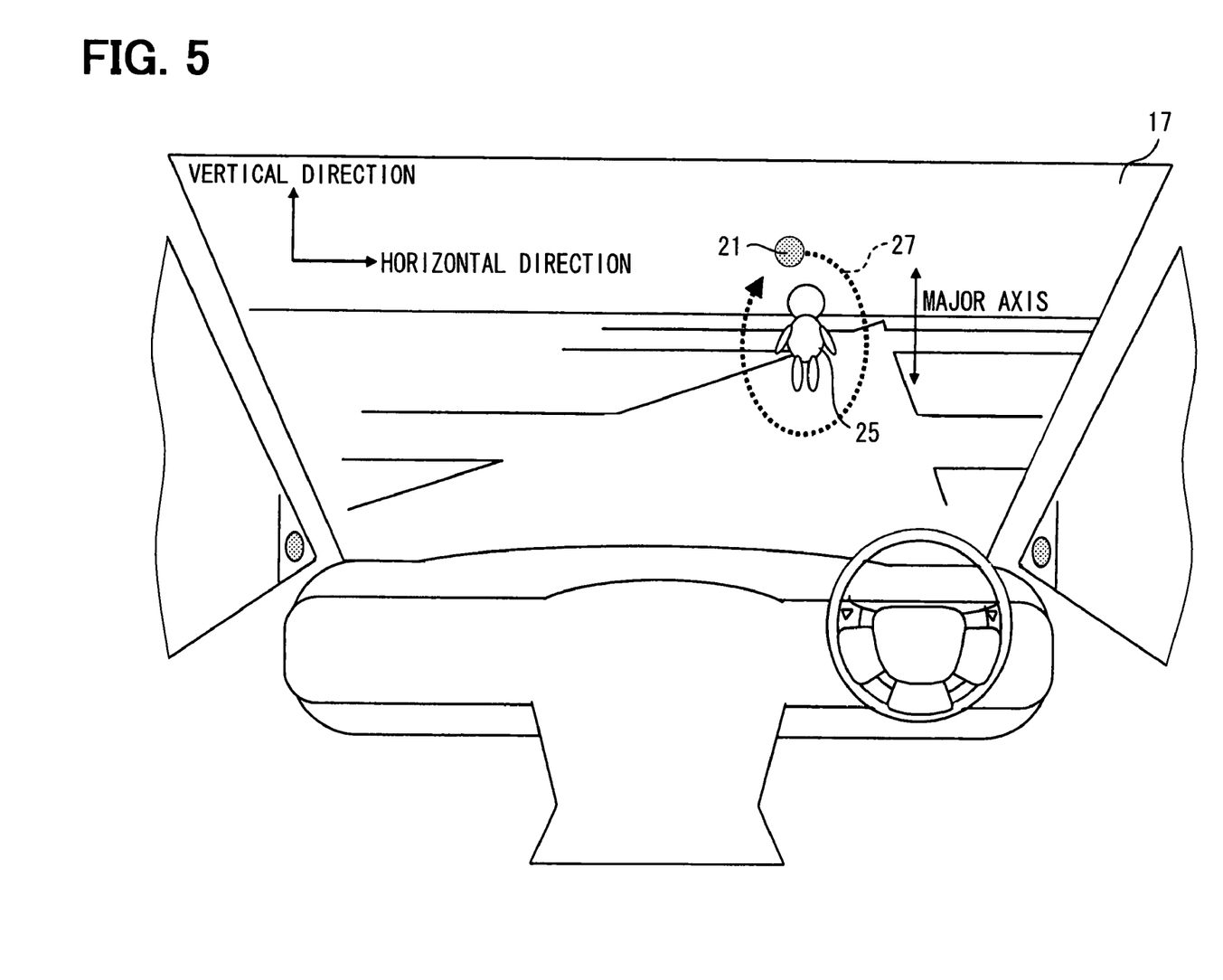
FIG. 5 is a schematic drawing showing a virtual image spot encircling a pedestrian seen by a driver through a windshield.

As shown in FIGS. 4 and 5, the virtual image 21 is shown as a spot encircling a front vehicle 23 (FIG. 4) or a pedestrian 25 (FIG. 5) seen through the windshield 17. More particularly, the virtual image spot 21 moves along a circle (or an oval) 27 encircling the front obstacle 23, 25. Further, a color of the virtual image spot 21 can be variously changed, from blue-green to red-orange.

The camera 7 positioned close to the driver's eyes 19 takes an image in front of the vehicle through the windshield 17. The obstacle-detecting circuit 9 determines whether an obstacle, such as a vehicle or a pedestrian, is located in front of the vehicle based on the front image taken by the camera 7. If there is an obstacle, the obstacle-detecting circuit 9 calculates an angular direction to the obstacle, a distance to the obstacle and a size of the obstacle. These calculations may be made according to a known method based on a shape, movement and brightness of the obstacle. The setting circuit 11 sets the degree of collision danger with the front obstacle according to a method described later. The vehicle speed sensor 13 detects a driving speed of the vehicle and supplies the detected vehicle speed to the setting circuit 11. The speaker 14 is disposed in a passenger compartment and outputs a warning according to the degree of collision danger.

Figure 2:
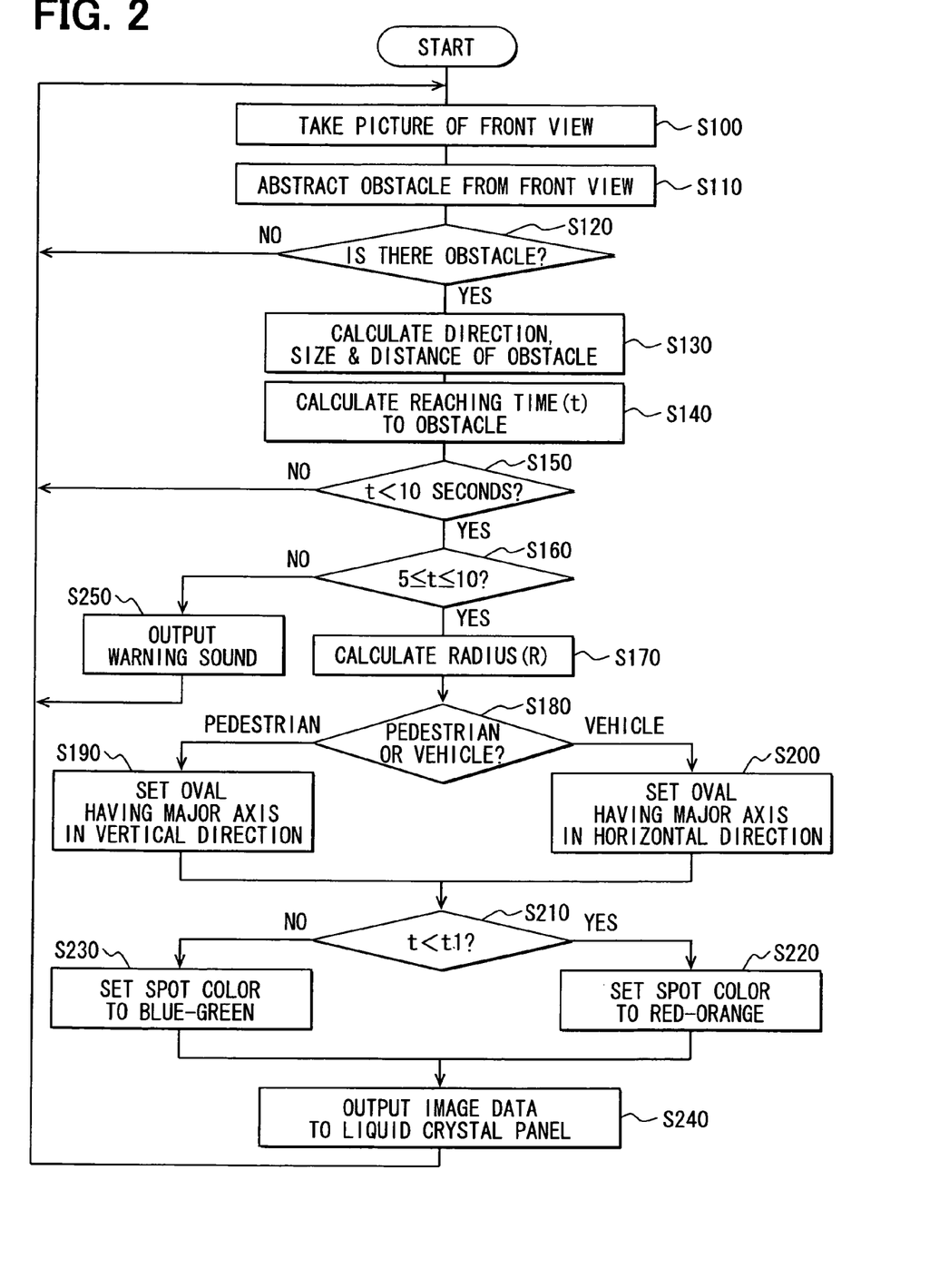
FIG. 2 is a flowchart showing a process of displaying a virtual image spot encircling a front obstacle.
Figure 3:
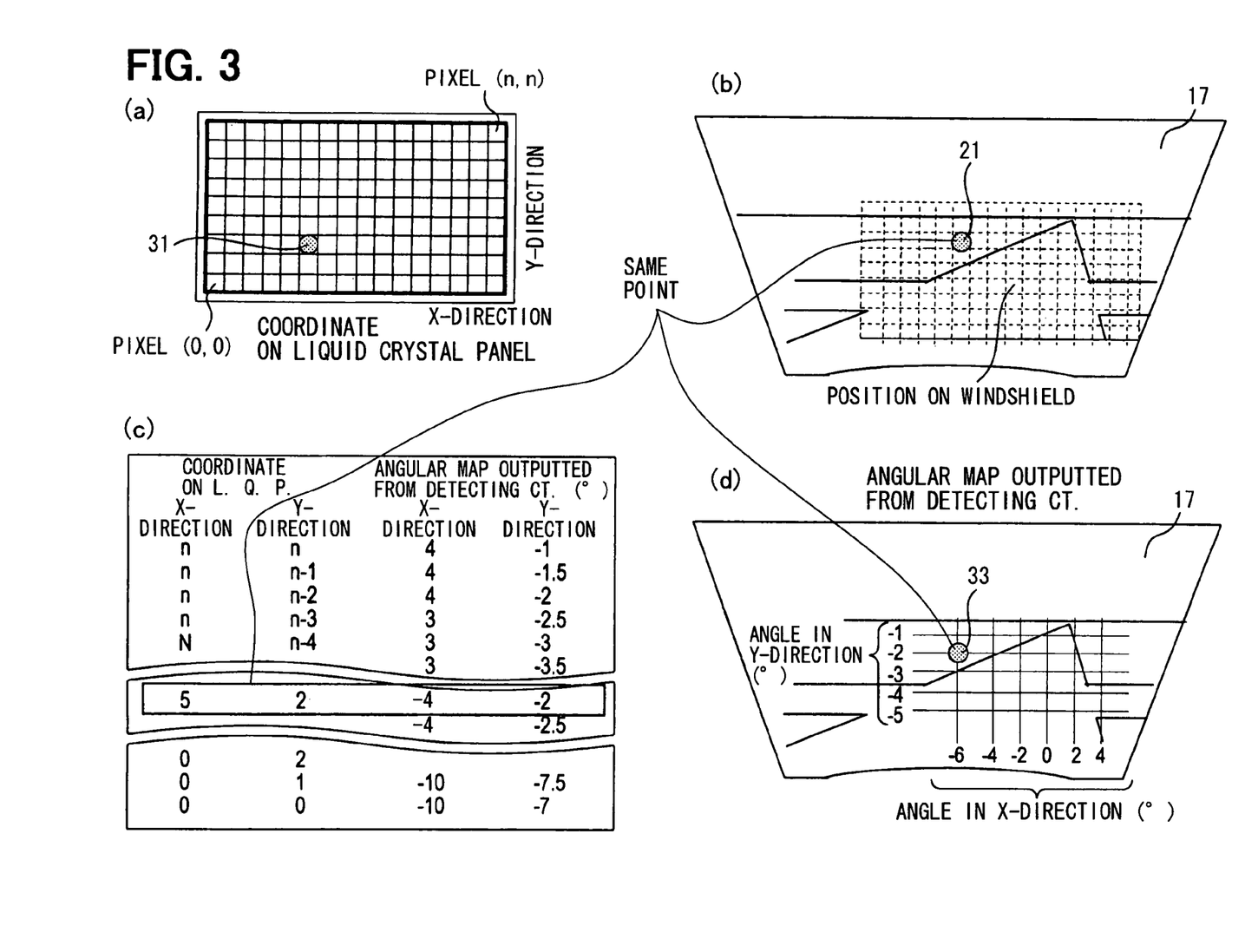
FIG. 3(a) shows a coordinate on a liquid crystal panel.
FIG. 3(b) shows a position of a virtual image spot on a windshield.
FIG. 3(c) is a map showing a relation between a spot on the coordinate of the liquid crystal panel and an angular direction of a front obstacle.
FIG. 3(d) is a map showing angular direction of a front obstacle outputted from a detecting circuit.

With reference to FIG. 2-6, a process of displaying the virtual image spot 21 will be described. The process shown in FIG. 2 is performed upon turning on an ignition switch of the engine. At step S100, a front image of the vehicle through the windshield 17 is taken by the camera 7. At step S110, a front obstacle is abstracted from the front image taken by the camera 7. The abstraction of the front obstacle may be performed according to a known method. For example, a shape and a size of a specified obstacle such as a pedestrian or a vehicle are memorized in a memory, and a front object is compared with the memorized shape and size. If there is an object similar to the memorized obstacle in the front image taken by the camera 7, it is determined that the object is an obstacle to be abstracted.

At step S120 whether a front obstacle is detected or not is determined. If there is an obstacle, the process proceeds to step S130. If not, the process returns to step S100. At step S130, an angular direction to the obstacle (an angular direction from the driver's eyes to the obstacle), a distance to the obstacle from the own vehicle 2 and a size of the obstacle is calculated by the object-detecting circuit 9. At step S140, the setting circuit 11 calculates a period of time for the own vehicle to reach the obstacle based on the distance to the obstacle and the vehicle speed fed from the speed sensor 13.

At step S150, the setting circuit 11 determines whether the calculated time (t) reaching the front obstacle is less than 10 seconds. Further, whether the angular direction to the obstacle lies within a predetermined range (for example, whether the obstacle is on a road) is also determined at step S150. If the obstacle is located within the predetermined angular direction and the calculated reaching time (t) is less than 10 seconds, it is determined that the degree of collision danger is such a level that requires a warning or displaying the virtual image spot 21, and the process proceeds to step S160. On the other hand, if the angular direction is not within the predetermine range and/or the reaching time (t) is longer than 10 seconds, it is determined that the degree of collision danger is a level that does not require the warning or the displaying the virtual image spot, and the process returns to step S100.

At step S160, whether the reaching time (t) is within a range from 5-10 seconds is determined by the setting circuit 11. If the reaching time (t) is within this range, the process proceeds to step S170. If the reaching time (t) is out of that range, i.e., less than 5 seconds, the process proceeds to step S250, where a warning is given to the driver from the speaker 14. At step S170, the setting circuit 11 calculates a radius of a circle 27 along which the virtual image spot 21 moves according to the following formula: R=K(S/D), where K is a constant (dots/m), S is a size of an obstacle (dots/m) and D is a distance to the obstacle (m). This means that the radius R of the circle 27 is calculated based on the size S of the obstacle and the distance D to the obstacle. The radius R is set larger as the distance D is shorter and/or as the size S is larger.

At step S180, whether the obstacle is a pedestrian or a vehicle is determined by the setting circuit 11. This determination may be made according to a known method. For example, a shape and a size of a pedestrian and a vehicle are memorized in a memory, and those of a detected obstacle are compared with the memorized ones. If the obstacle is a pedestrian, the process proceeds to step S190. If the obstacle is a vehicle, the process proceeds to step S200. At step S190, the shape of the circle 27 is set to an oval having a major axis in the vertical direction (refer to FIG. 5). At step S200, the shape of the circuit 27 is set to an oval having a major axis in the horizontal direction (refer to FIG. 4).

At step S210, whether or not the reaching time (t) calculated at step S140 is shorter than (t1) is determined. The period of time (t1) (the period of time (t1) is simply referred to as time t1 to simplify explanation) is set to a predetermined time between 5 seconds and the 10 seconds. If the reaching time (t) is shorter than (t1), i.e., t<t1, it is determined that the degree of collision danger is very high, and the process proceeds to step S220, where the color of the virtual image spot 21 is set to red-orange. If the reaching time (t) is longer than (t1), i.e., t≧t1, it is determined that the degree of collision danger is not very high, and the process proceeds to step S230, where the color of the virtual image spot 21 is set to blue-green.

At step S240, the image-outputting circuit 3 outputs image data to the liquid crystal panel 5. The virtual image spot 21 is displayed as shown in FIGS. 4 and 5 based on the image shown on the liquid crystal panel 5. The virtual image spot 21 encircles along the circle (or oval) 27. The position, the radius R and the shape of the circle 27 are determined in the following manner.

The angular direction of the obstacle calculated at step S130 is represented by a combination of X-direction (horizontal direction) and Y-direction (vertical direction), as shown in FIG. 3(d). As shown in FIG. 3(c), a conversion table between the angular direction of the obstacle 33 calculated by the obstacle-detecting circuit 9 and a coordinate on the liquid crystal panel 5 is memorized in a memory (not shown) in the display device 1. A display 31, a coordinate of which is converted according to the conversion table, is shown on the coordinate of the liquid crystal panel 5, as shown in FIG. 3(a). A position of the virtual image spot 21 generated by the display 31 corresponds to the position of the obstacle 33 when viewed from the driver, as shown in FIGS. 3(b) and 3(d).

The image-outputting circuit 3 calculates the coordinate corresponding to the obstacle 33 on the liquid crystal display panel 5 based on the angular direction of the obstacle calculated by the obstacle-detecting circuit 9 and the conversion table mentioned above. This coordinate is made a center of the circle 27. The radius R of the circle 27 is set to the radius calculated at the step S170. When the circuit 27 is an oval, the radius in the major axis direction is set to R, and radius in the minor axis direction is set to α·R, where α is a coefficient, e.g., 0.8. The direction of the major axis of an oval is determined at step S190 or S200 as mentioned above. The color of the virtual image spot 21 is determined according to the reaching time (t) as explained above. Instead of changing the color of the virtual image spot, its brightness maybe changed according to the degree of collision danger. For example, the brightness may be made higher when the reaching time (t) is shorter than (t1), while making it lower when the reaching time (t) is longer than (t1).

Figure 7:
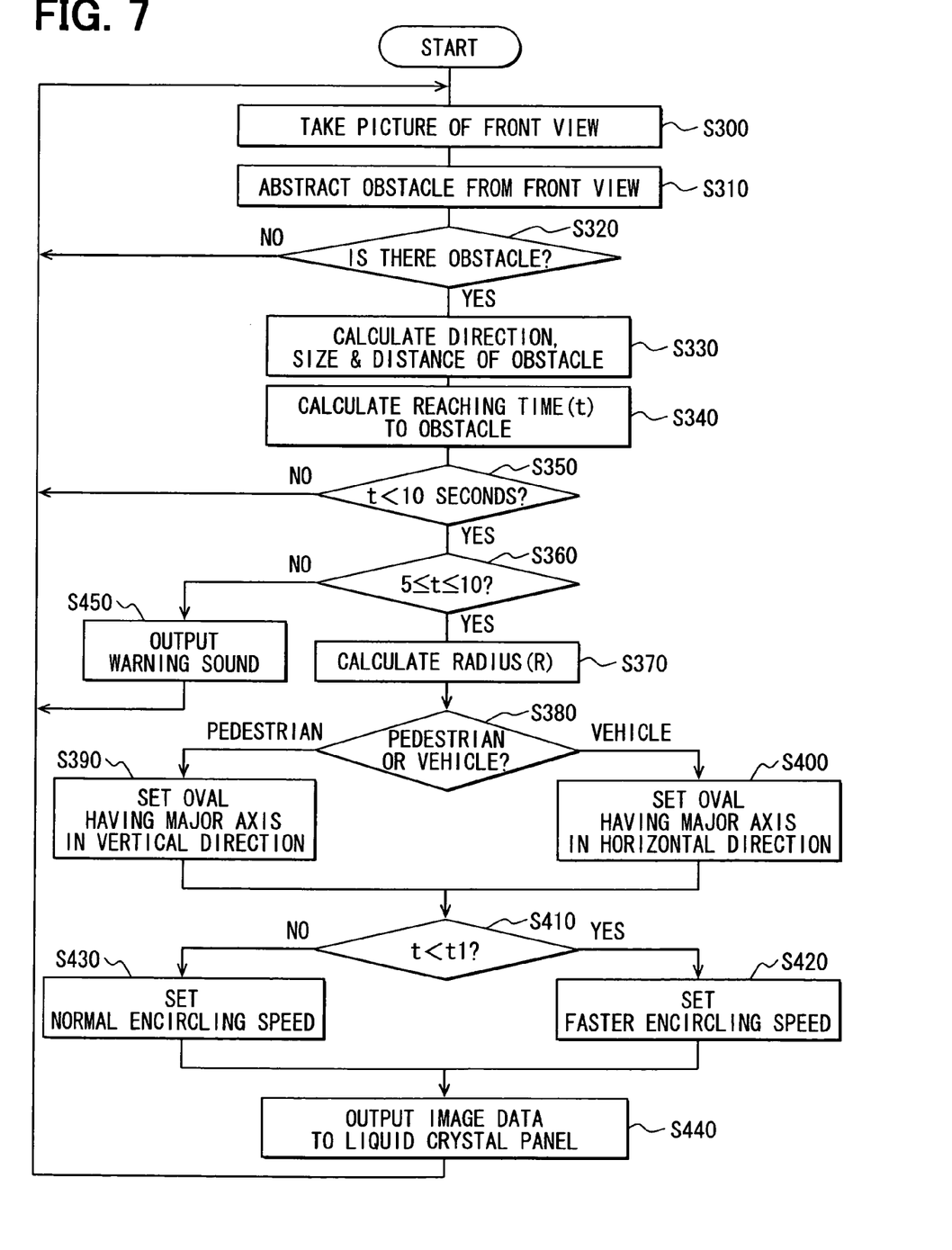
FIG. 7 is a flowchart showing a modified form of the process shown in FIG. 2.

With reference to the flowchart shown in FIG. 7, a modified form of the process of displaying the virtual image spot 21 will be described. Steps S300-S410 and S440 shown in FIG. 7 are the same as those of steps S100-S210 and S240. Only steps S420 and S430 shown in FIG. 7 are different or modified from steps S220 and S230.

If it is determined that the reaching time (t) is shorter than (t1) at step S410, the process proceeds to step S420, where a encircling speed of the virtual image spot 21 is set higher, e.g., more than 2 rotations per second. If it is determined that the reaching time (t) is longer than (t1) at step S410, the process proceeds to step S430, where the encircling speed is set to a normal speed, e.g., 2 rotations per second. Since the degree of collision danger is higher when the reaching time (t) is shorter, the encircling speed of the virtual image spot 21 is made higher to effectively draw the driver's attention. Instead of changing the encircling speed according to the degree of collision danger, it may be possible to change a period for displaying the virtual image spot 21. In this case, the virtual image spot 21 is displayed for a longer period when the reaching time (t) is shorter.

Advantages attained in the present invention are summarized below. The degree of collision danger with an obstacle is set according to a period of time in which the own vehicle reaches a detected obstacle. A predetermined time t1 which falls in a range form 5 seconds to 10 seconds is set. The degree of collision danger is set according to the reaching time as follows: when the reaching time (t) is less than 5 seconds (t<5), the degree of collision danger is set to D1; when (t) is between 5 seconds and t1 seconds (5≦t<t1), it is set to D2; when (t) is between (t1) and 10 seconds (t1≦t≦10), it is set to D3; and when (t) is beyond 10 seconds (t>10), it is set to D4.

The color, brightness, encircling speed and display period of the virtual image spot 21 are varied according to the degree of collision danger in the following manner. The color is set to red-orange in D2, while it is set to blue-green in D3. The brightness is made high in D2, while it is made low in D3. The encircling speed is set high in D2, while it is set low in D3. The display period is made long in D2, while it is made short in D3. In this manner, the driver can easily recognize an obstacle that is in high degree of collision danger. Further, the virtual image spot 21 encircling a front obstacle seen through the windshield 17 is displayed only when the degree of collision danger is in D2 and D3. Thus, it is avoided to give excessive trouble to the driver by displaying virtual image spot when the degree of collision danger is low, i.e., in D4. When the degree of collision danger is extremely high, i.e., in D1, there is no time for the driver to watch the displayed virtual image spot. In this case, therefore, a warning sound is given to the driver without displaying the virtual image spot 21.

The virtual image is shown as a spot 21 encircling a front obstacle seen through the windshield, not as a continuous square 105 as in the conventional device shown in FIG. 8. The spot 21 is always changing its position on the encircling circle 27. Therefore, changes in spot positions due to vehicle vibration are not easily recognized by the driver. On the contrary, since the conventional square 105 moves due to vehicle vibration, the driver easily recognizes the position changes, as exemplified as 105a, 105b and 105c in FIG. 9. Such movement caused by vehicle vibration which is troublesome for the driver is eliminated in the device according to the present invention.

Since the virtual image spot 21 in the present invention encircles the front obstacle seen through the windshield 17, driver's attention is easily drawn to the front obstacle. Since the radius R of the circle 27 is changed according to the size of the front obstacle and a distance to the front obstacle, the virtual image spot 21 better matches the front object. That is, the smaller the obstacle, the smaller the radius; the farther the obstacle, the smaller the radius, and vice versa. The shape of the circle 27 is changed according to types of a front obstacle detected. That is, the circle 27 is an oval having a major axis in the horizontal direction when the front obstacle is another car, as shown in FIG. 4. On the other hand, the circle 27 is an oval having a major axis in the vertical direction when the front obstacle is a pedestrian, as shown in FIG. 5. Therefore, the driver can immediately distinguish the pedestrian from the vehicle.

The present invention is not limited to the embodiment described above, but it maybe variously modified. For example, the degree of collision danger may be determined according to a distance between an obstacle and the own vehicle in place of the reaching time. If the distance is short (e.g., 10-20 m), the color of the virtual image spot 21 may be made red-orange, while if the distance is not short (e.g., 20-30 m), it may be made blue-green. Further, the degree of collision danger may be set based on a combination of a distance to a front obstacle and a moving direction of the front obstacle. For example, if the distance is 10-20 m and the obstacle is approaching, the color of the virtual image spot 21 may be made red-orange, while making it blue-green in other cases.

Figure 6:
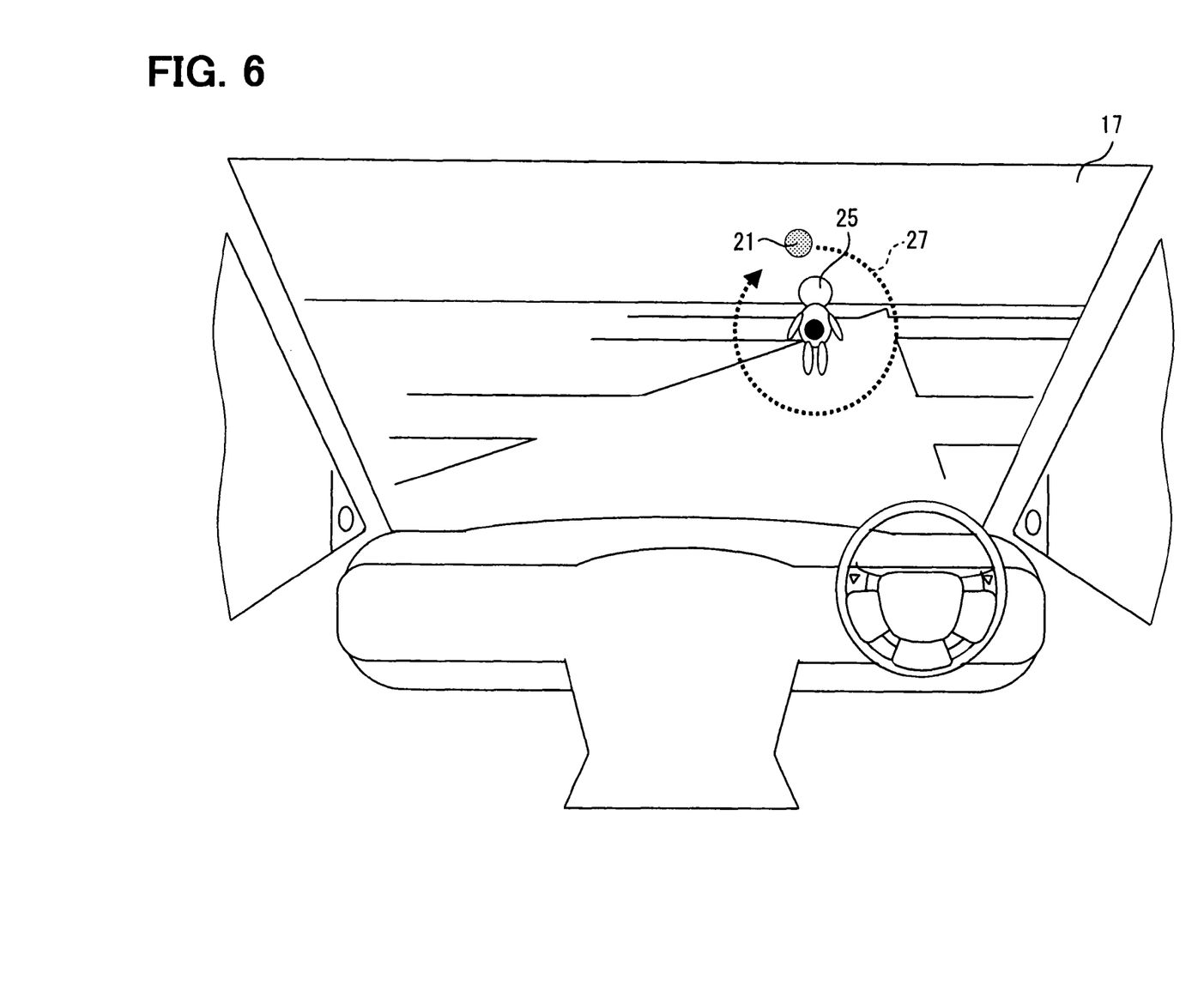
FIG. 6 is a schematic drawing showing a virtual image spot encircling a pedestrian with a constant radius.

The driving speed of the vehicle 2 may be obtained from an engine ECU (Electronic Control Unit) in place of the speed sensor 13. The degree of collision danger may be determined based on a future position of an obstacle that is estimated from a present position and a way of movement of the obstacle. Though the front obstacle is recognized by the on-board camera 7 in the foregoing embodiment, it is possible to obtain information regarding a front object through a vehicle-to-vehicle communication or a road-vehicle communication. Further, in place of the camera 7, a laser radar, a millimeter-wave radar, a stereo-camera or a combination thereof may be used. The criteria of reaching time (t) may not be fixed to 5 seconds or 10 seconds, but it may be set based on a time required to stop the vehicle. The required time may be calculated from a driving speed of the vehicle. The required time may be fixed to a time corresponding to a certain distance, e.g., 200 m which is not visible by the driver. The shape of the circle 27 may be a real circle, as shown in FIG. 6 without changing the shape of the circle according to types of an obstacle. In this case, process for displaying the virtual image spot is somewhat simplified.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A display device mounted on an automotive vehicle, the display device comprising:
    means for displaying a virtual image spot to a driver, the virtual image spot being formulated by reflecting light of an image on a windshield of the vehicle and being shown to the driver as if it were in front of the vehicle;
    means for detecting an obstacle in front of the vehicle;
    means for setting a degree of collision danger of the obstacle with the vehicle, based on at least either a distance between the vehicle and the obstacle or a relative speed between the vehicle and the obstacle; and
    means for controlling the virtual image spot, so that it encircles the front obstacle seen through the windshield if the degree of collision danger is in a predetermined range and ways of displaying the virtual image spot change according to the degree of collision danger.

2. The display device as in claim 1, wherein the controlling means changes a color of the virtual image spot according to the degree of collision danger.

3. The display device as in claim 2, wherein the controlling means sets the color of the virtual image spot to a color closer to a blue-green color as the degree of collision danger becomes lower, while setting it to a color closer to a red-orange color as the degree of collision danger becomes higher.

4. The display device as in claim 1, wherein the controlling means changes brightness of the virtual image spot according to the degree of collision danger.

5. The display device as in claim 4, wherein the controlling means makes the brightness of the virtual image spot higher as the degree of collision danger becomes higher, while making it lower as the degree of collision danger becomes lower.

6. The display device as in claim 1, wherein the controlling means changes a speed of the virtual image spot encircling the front obstacle according to the degree of collision danger.

7. The display device as in claim 1, wherein the controlling means changes a period of time for displaying the virtual image spot according to the degree of collision danger.

8. The display device as in claim 1, wherein the controlling means changes a shape of a circle along which the virtual image spot encircles the front obstacle according to types of the front obstacle.

9. The display device as in claim 8, wherein the circle is made to an oval shape having a major axis in the vertical direction if the front obstacle is a pedestrian.

10. The display device as in claim 8, wherein the circle is made to an oval shape having a major axis in the horizontal direction if the front obstacle is a vehicle.

* * * * *